(12) United States Patent
Baccash et al.

(10) Patent No.: US 7,467,127 B1
(45) Date of Patent: Dec. 16, 2008

(54) VIEW SELECTION FOR A MULTIDIMENSIONAL DATABASE

(75) Inventors: Jonathan M. Baccash, Sunnyvale, CA (US); Igor Nazarenko, Sunnyvale, CA (US); Uri Rodny, Mountain View, CA (US); Ambuj Shatdal, Madison, WI (US)

(73) Assignee: Hyperion Solutions Corporation, Santa Clara, CA (US)

( * ) Notice: Subject to any disclaimer, the term of this patent is extended or adjusted under 35 U.S.C. 154(b) by 366 days.

(21) Appl. No.: 10/863,870

(22) Filed: Jun. 7, 2004

Related U.S. Application Data

(60) Provisional application No. 60/548,197, filed on Feb. 27, 2004.

(51) Int. Cl.
*G06F 7/00* (2006.01)
*G06F 17/00* (2006.01)

(52) U.S. Cl. .......................................... 707/2
(58) Field of Classification Search ................ 707/2
See application file for complete search history.

(56) References Cited

U.S. PATENT DOCUMENTS

| | | | |
|---|---|---|---|
| 5,428,773 A * | 6/1995 | Berkovich ........... | 707/1 |
| 2003/0126143 A1* | 7/2003 | Roussopoulos et al. ..... | 707/100 |

OTHER PUBLICATIONS

Harinarayan, Venky, et al., "Implementing Data Cubes Efficiently", SIGMOD Conference 1996: 205-216, pp. 1-25, http://www.informatik.uni-trier.de/~ley/db/conf/sigmod/HarinarayanRU96.html.

Nadeau, Thomas P., "Achieving Scalability in OLAP Materialized View Selection", http://www.cis.drexel.edu/faculty/song/dolap02/presentation/DOLAP02-nadeau..ppt.

* cited by examiner

*Primary Examiner*—Wilson Lee
*Assistant Examiner*—Alex Gofman
(74) *Attorney, Agent, or Firm*—Hickman Palermo Truong & Becker LLP

(57) ABSTRACT

Selection of certain views of a multidimensional database to materialize may be accomplished using an efficient and effective solution. A set of all potential views may be stored in a structure. A path in the structure may then be traversed in an indicated direction through the structure, the path including two or more potential views and beginning at an indicated view. Then two or more immaterialized views in the path may be compared to each other to determine which immaterialized view is the optimum choice for maximizing benefit if selected to be materialized. Then the traversing and comparing may be continually iterated through, each iteration utilizing an indicated direction different than the last, each iteration also utilizing an indicated view set at the optimum choice determined by the last iteration, the iterating continuing until it converges on a single view. That single view may then be selected for materialization.

51 Claims, 10 Drawing Sheets

|         | Iteration 1 Benefit | Iteration 2 Benefit |
|---------|---------------------|---------------------|
| {p, s}  | 5.2M x 4 = 20.8M    |                     |
| {c, s}  | 0 x 4 = 0           | 0 x 2 = 0           |
| {c, p}  | 0 x 4 = 0           | 0 x 2 = 0           |
| {s}     | 5.99M x 2 = 11.98M  | 0.79M x 2 = 1.58M   |
| {p}     | 5.8M x 2 = 11.6M    | 0.6M x 2 = 1.2M     |
| {c}     | 5.9M x 2 = 11.8M    | 5.9M x 2 = 11.8M    |
| { }     | 6M - 1              | 0.8M - 1            |

FIG. 2

| Candidates | Iteration 1 Benefit |
|---|---|
| {p,s} | 5.2M x 4 = 20.8M |
| {s} | 5.99M x 2 = 11.98M |
| { } | 6M - 1 |

FIG. 3

|  | All | Years | Quarters | Months |
|---|---|---|---|---|

Grid with row labels (top to bottom): All, Years, Quarters, Months
Column labels (left to right): Product Identifiers, Groups, All Markers 602 (Years/Groups area) and 600 (Quarters/Groups area). Bold cell labeled "Input" at Months/Product Identifiers.

FIG. 6

|  | Years | 802 | | |
|---|---|---|---|---|
| All | | | | |
| Years | | 802 | | |
| Quarters | | 800 | | |
| Months | | Input | | |

Layout (as shown):

- Rows (top to bottom): All, Years, Quarters, Months
- Columns (left to right): Product Identifiers, Groups, All
- Cell at (Years, Product Identifiers): 802
- Cell at (Quarters, Product Identifiers): 800
- Cell at (Months, Product Identifiers): Input

FIG. 8

VIEW SELECTION FOR A MULTIDIMENSIONAL DATABASE

CROSS-REFERENCE TO RELATED APPLICATION

The present invention claims priority based on provisional patent application Ser. No. 60/548,197, entitled "VIEW SELECTION FOR A MULTIDIMENSIONAL DATABASE", by Jonathan Baccash, Igor Nazarenko, Uri Rodny and Ambuj Shatdal, filed on Feb. 27, 2004.

FIELD OF THE INVENTION

The present invention relates to the field of computer databases. More specifically, the present invention relates to the selection of a view for a multidimensional database.

BACKGROUND OF THE INVENTION

Database applications are commonly used to store large amounts of data. One branch of database applications that is growing in popularity is Online Analytical Processing (OLAP) applications. OLAP involves the use of computers to extract useful trends and correlations from large databases of raw data. It may involve consolidating and summarizing huge databases containing millions of items (e.g., sales figures from all branches of a supermarket chain) and making this data viewable along multidimensional axes, while allowing the variables of interest to be changed at will in an interactive fashion. As such, the processing and memory load on OLAP servers is very high.

Typically, a multidimensional database stores and organizes data in a way that better reflects how a user would want to view the data than is possible in a two-dimensional spreadsheet or relational database file. Multidimensional databases are generally better suited to handle applications with large volumes of numeric data and that require calculations on numeric data, such as business analysis and forecasting, although they are not limited to such applications.

A dimension within multidimensional data is typically a basic categorical definition of data. Other dimensions in the database allow a user to analyze a large volume of data from many different perspectives. Each dimension may have a hierarchy associated with it. For example, a product group dimension may have a sublevel in the hierarchy that includes entries such as drinks and cookies. The drinks entry may then have its own sublevel of individual product identifiers for each type of drink sold. Each hierarchy may have any number of levels.

For each event, measures may be recorded. In a sales example, this may include sales amount, product identifier, location of purchase, etc. This raw information is known as input level data. This data may be stored in a multidimensional cube. This cube may be extremely large given the number of dimensions and variables typical to businesses, but it may also be extremely sparse, in that there are large gaps where no information is stored. This is because only a small percentage of the possible combinations of variables will actually be used (e.g., no customer is going to purchase every single item in stock over their lifetime, let alone in a single day).

Users typically will issue queries to the database in order to get information they want or need. These queries will typically ask for a summary of data across certain dimensions. In many applications, querying a single cell in the database is rarely needed, as the user typically would not be interested in that fine a detail. For example, in a supermarket chain database, a user may be interested in overall sales for various stores in the month of January, or sales of a certain soft drink in the Southwest over the last year, but they would probably not be interested in how much of a particular product a single customer bought on a single day. Each query run results in what is called a view of the data. As there are a large number of possible queries that can be run, there also are a large number of possible views.

In a relational database, these queries are executed dynamically at runtime, at which point the appropriate data is aggregated. While this method requires the least amount of dedicated storage space, it can be slow, especially as the size of the cube increases. Users typically aren't willing to allow a significant amount of time to run a query.

One solution is to pre-run every single possible query, and thus pre-load every possible view into a memory. While this certainly reduces runtime delays, for very large cubes it can take up a significant amount of memory and processing power. In fact, for cubes typical in many businesses, such a solution would require years of processing time, which is obviously impractical.

Therefore, it becomes beneficial to pre-load only a selected number of key views, perhaps the ones most likely to be used, into the memory. A decision must therefore be made as to which views should be selected.

Most of the previous work in view selection is based on a hypercube lattice structure. FIG. 1 is a diagram illustrating an example hypercube lattice structure. Each node of the structure represents a possible view. Here, the structure is based on a 3-dimensional cube having no hierarchies. The numbers associated with the nodes represent the number of rows for that view. These numbers are typically derived by some sort of view size estimation process. Here the number of rows of affected records is used as a rough estimate. The root node 100 in the structure represents the raw input data. A given view can be calculated from any materialized ancestor view.

In one approach to selecting which views to materialize, an iterative process is executed. At each stage in the iterative process, the benefits of selecting each possible view are calculated, and the most beneficial view is selected for materialization. The calculation of these benefits includes examining the effects on descendants of the view. This process is repeated (with the selected views removed from the set of possible views), selecting a new view to materialize at each iteration. This process repeats until a predetermined number of materialized views has been reached.

The drawback to this approach is that it requires the evaluation of every unselected view during each iteration, and each evaluation considers the effect on every descendant. This process then consumes on the order of $kn^2$ time, where k is equal to the number of views to select and n is the number of nodes (views) in the set. While this order of complexity might at first look good as it is on the order of polynomial time, the result is misleading. The number of nodes (views) in a set is actually exponential relative to the number of dimensions in the cube. In a database with no hierarchies, that would still result in $2^d$ possible views, where d is the number of dimensions. Thus the time complexity of the iterative approach described above is actually on the order of $k2^{2d}$. This results in an impractical amount of time required simply to make the selection of which views to materialize. The processing power and memory capacity required to make such calculations for large cubes is such that any system with that level of resources wouldn't need to select only certain views in the first place—it could afford to materialize all views.

Thus, it has been proposed that the iterative approach be modified to allow for a two step process. In this new approach, each iteration is divided into a nomination phase and a selection phase. The first phase nominates promising views into a candidate set. The second phase estimates the benefits of materializing each candidate. As will be seen, this approach essentially finds the path of least resistance starting from the root view (input).

This is accomplished by first, in the nomination stage, starting at the root, and then examining the direct children of the root. In FIG. 1, this would involve examining views 102, 104, and 106 to determine which one would have the least query time (assuming all already selected views have been materialized). Here 102 had the least query time. Then view 102 would be added to the list of candidates, and the direct children of 102 would be examined (108, 110). Here, 108 would have the least query time, and thus is also added to the candidate set. Once the bottom of the lattice is reached, the nomination stage ends. Here, this results in a candidate set 102, 108, 112. FIG. 2 is a diagram illustrating an example of the nomination stages of two iterations of this process.

In the selection phase, each view in the candidate set is evaluated, and the view that appears to yield the most benefit is materialized. Here, the evaluation for each candidate is performed by taking the difference with the smallest ancestor selected for materialization, and multiplying the savings by the estimated number of nodes affected. The number of nodes affected may be estimated in two steps. First, the number of descendants is calculated, including the candidate itself. Then the process looks for materialized views smaller than the candidate. If any such view is found, the process accounts for the effect of the view with the largest number of descendants in common with the candidate. The overlapping descendants are subtracted from the count of views affected by materializing the candidate, since the benefits are undercut by the other view. FIG. 3 is a diagram illustrating an example of the selection phase of the first iteration.

The view 102 is then selected for materialization during the first iteration, and is removed from the candidates. Then the second iteration may begin with another nomination phase. This continues until a predetermined number of views have been selected.

This modified approach results in on the order of $(kN)^2$ processing time, where k is the number of views and N is the number of potential aggregates. The problem with the modified approach, however, is that it was designed without hierarchies in mind. While a number of dimensions can certainly create a moderately sized lattice, the addition of hierarchies makes even this processing time on a non-exponential order unwieldy. The nomination stage grows significantly complicated, as at each node all direct children must be examined. What is needed is a solution that further reduces the order of complexity for processing time for selecting views to be materialized for a multidimensional cube.

BRIEF DESCRIPTION

Selection of certain views of a multidimensional database to materialize may be accomplished using an efficient and effective solution. A set of all potential views may be stored in a structure. A path in the structure may then be traversed in an indicated direction through the structure, the path including two or more potential views and beginning at an indicated view. Then two or more immaterialized views in the path may be compared to each other to determine which immaterialized view is the optimum choice for maximizing benefit if selected to be materialized. Then the traversing and comparing may be continually iterated through, each iteration utilizing an indicated direction different than the last, each iteration also utilizing an indicated view set at the optimum choice determined by the last iteration, the iterating continuing until it converges on a single view. That single view may then be selected for materialization.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2 is a diagram illustrating an example of the nomination stages of two iterations of a view selection process.

FIG. 3 is a diagram illustrating an example of a selection phase of a first iteration of a view selection process.

FIG. 6 is a diagram illustrating a second iteration of an embodiment of the present invention.

FIG. 8 is a diagram illustrating a fourth iteration of an embodiment of the present invention.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
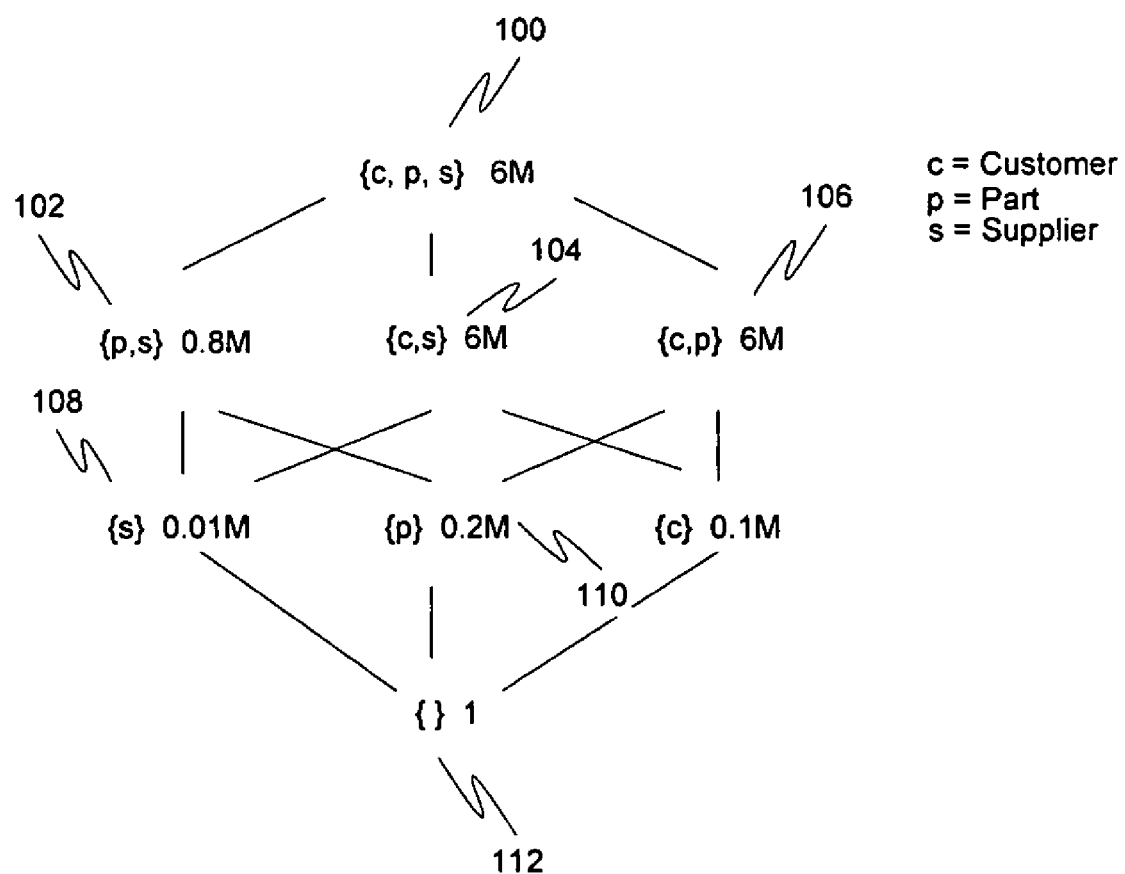
FIG. 1 is a diagram illustrating an example hypercube lattice structure.
Figure 4:
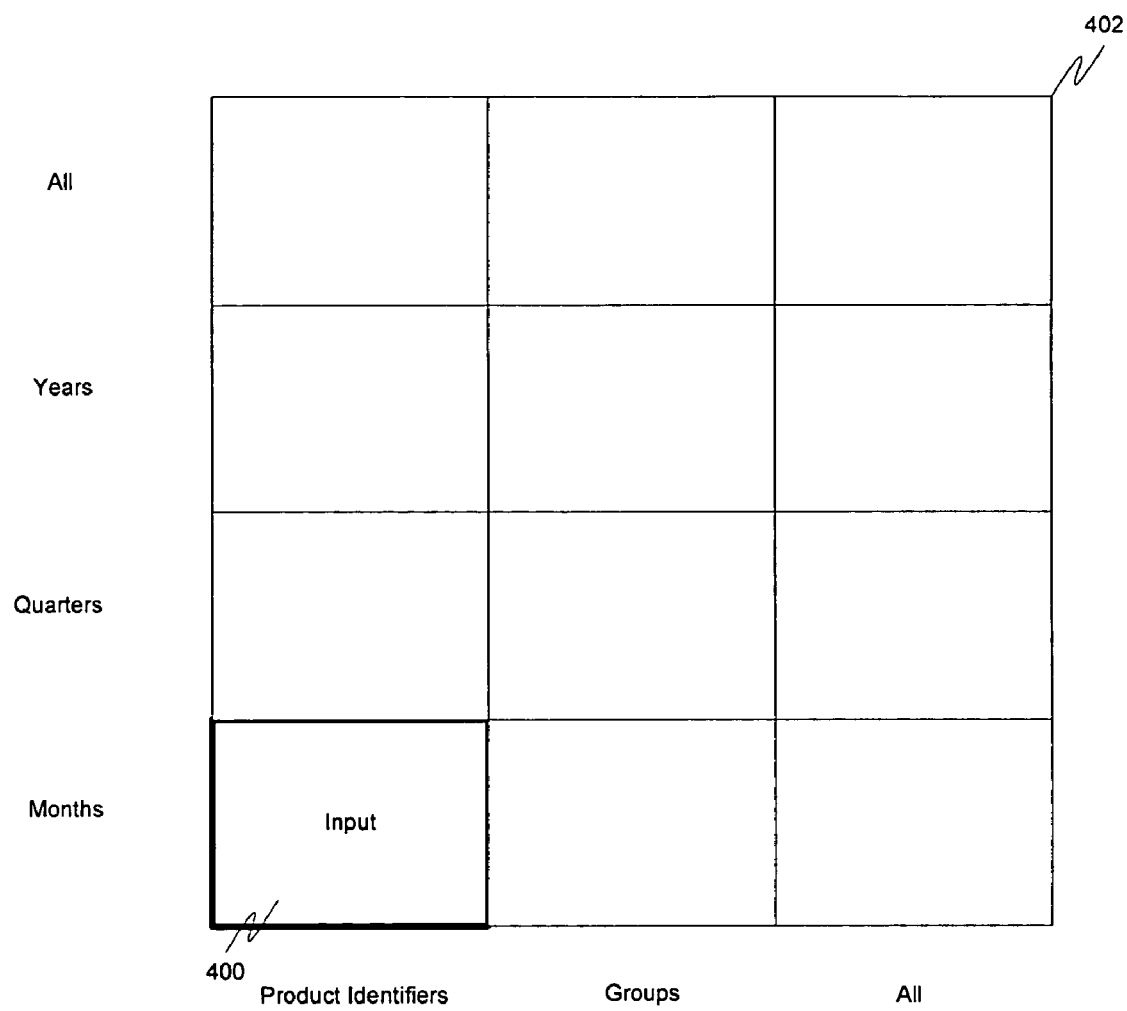
FIG. 4 is a diagram showing possible views for a multidimensional cube in accordance with an embodiment of the present invention.

FIG. 4 is a diagram showing possible views for a multidimensional cube in accordance with an embodiment of the present invention. Here, for simplicity, the cube is quite small, having only two dimensions with the first dimension having four entries in a sublevel in its hierarchy, and the other dimension having three. In many real-world cases, of course, the cube would be much larger. This perspective is easier to visualize than a lattice when dealing with hierarchies. One of ordinary skill in the art will recognize, however, that lattices could be used in practice with the present invention.

Figure 5:
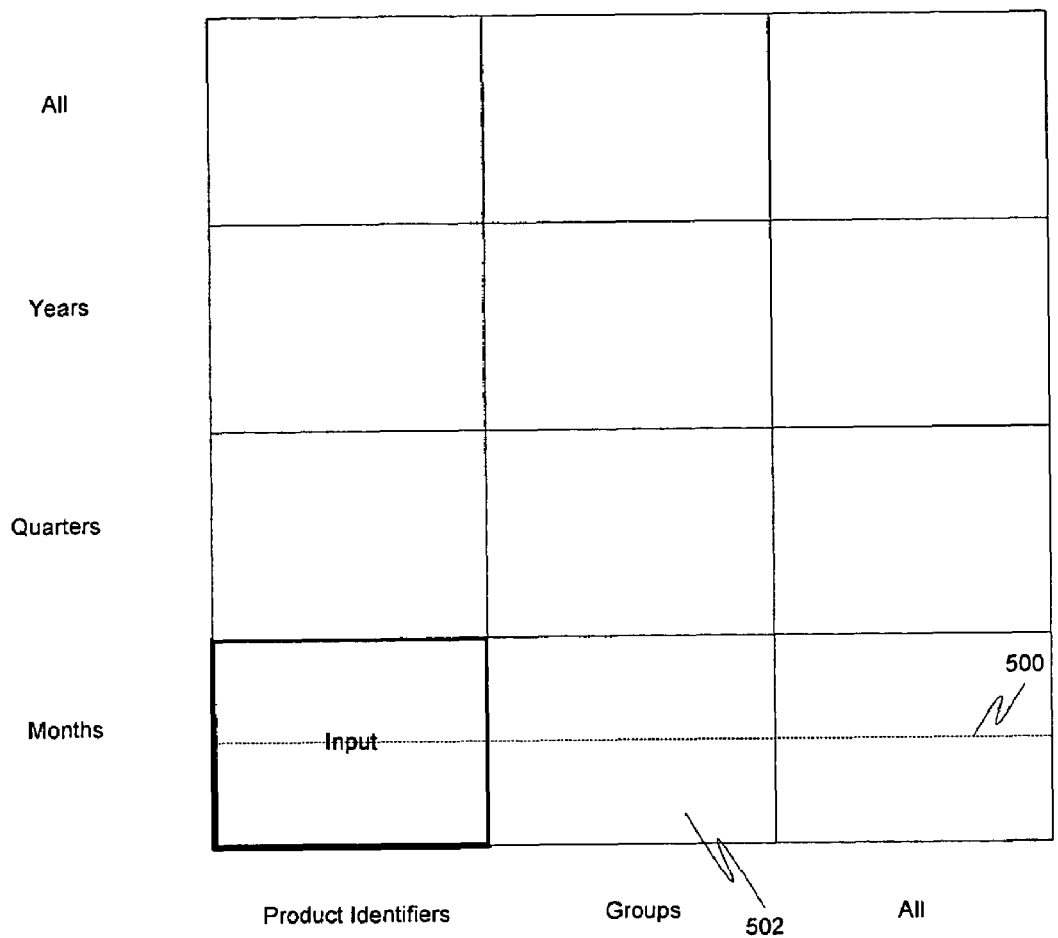
FIG. 5 is a diagram illustrating a first iteration of an embodiment of the present invention.

The Input data 400 is already selected as a view. Thus the question becomes: which remaining view(s) should be materialized. Here, an iterative approach is also followed, but rather than examine all children of each node, the process moves line-wise only. It may begin either vertically or horizontally, and from either the root input data 400 or the end 402. FIG. 5 is a diagram illustrating a first iteration of an embodiment of the present invention. Here, an imaginary line 500 is drawn horizontally starting at the root input data 400. All immaterialized views are then compared, and the view with the most materialization benefit is chosen as the optimum. This optimum view is then fed into the next iteration, where the line changes direction from horizontal to vertical. Here, assume view 502 was the optimum. FIG. 6 is a diagram illustrating a second iteration of an embodiment of the present invention. The line 600 traverses immaterialized views, which are then compared, and the view with the most materialization benefit is chosen as optimum. This new optimum is then passed to the next iteration, where once again the line changes direct (here, to horizontal), and the comparison is repeated. The process continues iterating until the lines converge on a single view. This single view representing the convergence is then selected to be materialized.

Detecting the convergence may occur by detecting when the optimum views repeat. In one embodiment of the present invention, a single repeated optimum view chosen triggers the end of the iterations. However, one of ordinary skill in the art would recognize that embodiments are possible where more than a single repeated optimum view chosen is necessary to trigger the end of the iterations.

Figure 7:
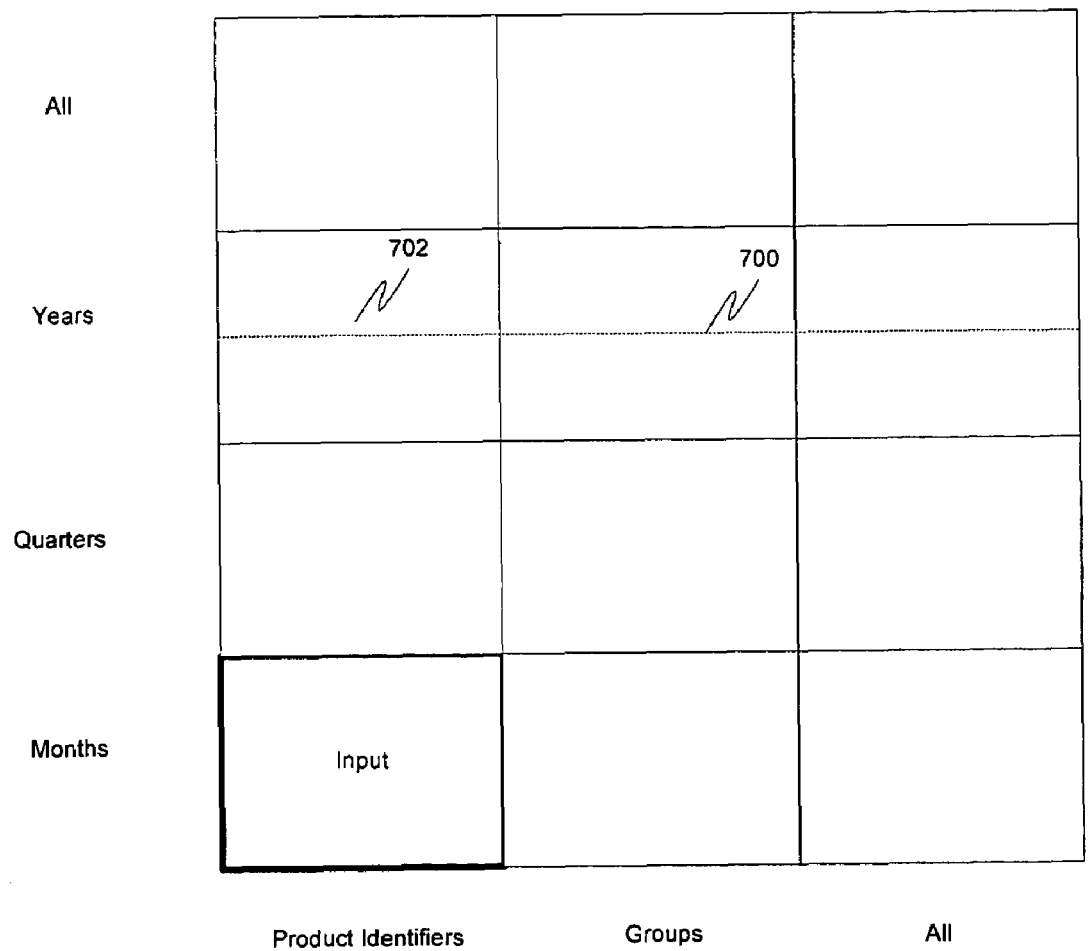
FIG. 7 is a diagram illustrating a third iteration of an embodiment of the present invention.

Thus, if in FIG. 6, view 602 is selected as the optimum, then FIG. 7 is a diagram illustrating a third iteration of an embodiment of the present invention. Line 700 traverses more immaterialized views. If in FIG. 7, view 702 is selected as the optimum, then FIG. 8 is a diagram illustrating a fourth iteration of an embodiment of the present invention. Here, Line 800 traverses more immaterialized views, but selects view 802 as the optimum, which is identical to the optimum view 702 in FIG. 7. Thus, since the optimum view has repeated twice in a row, in an embodiment of the present invention it will be assumed that the lines have converged and view 802 may be selected for materialization.

This process results in a complexity on the order of linear time, which greatly speeds the process when dealing with cubes with hierarchies of a certain size or larger, which are typical in many businesses.

Additionally, this process may be modified to achieve even greater performance. In one embodiment of the present invention, rather than every view on a particular line being compared, the process simply compares a random sampling of views on that line. If the sample is good enough, than the process' speed greatly improves with little or no impact on reliability.

In another embodiment of the present invention, the process may be run twice for each view to be selected. In one of the process executions, it begins at the root node (the bottom left corner of the example diagrams), whereas at the other, it begins at the end (the top right corner of the example diagrams). This results in two separate possible views to materialize, and the best one may be chosen. This obviously would slow performance slightly, but would result in greater reliability.

In another embodiment of the present invention, the process begins at a random node in the structure. This may help to eliminate any biases that could creep up when using either of the corners as a starting point.

In another embodiment of the present invention, the process alternates which direction in which it begins. Therefore, rather than beginning by always drawing a horizontal line, it may alternate between beginning with a horizontal line and a vertical line, or may randomly choose between the two. This also may help eliminate any biases that could creep up.

The present invention also has an additional advantage over the prior art techniques. Using this approach, each step tends to correct errors in decisions made in previous steps, such that a single mistake in comparison would not necessarily result in an incorrect view being selected. Thus, the present technique tends to be more reliable than prior art techniques.

Figure 9:
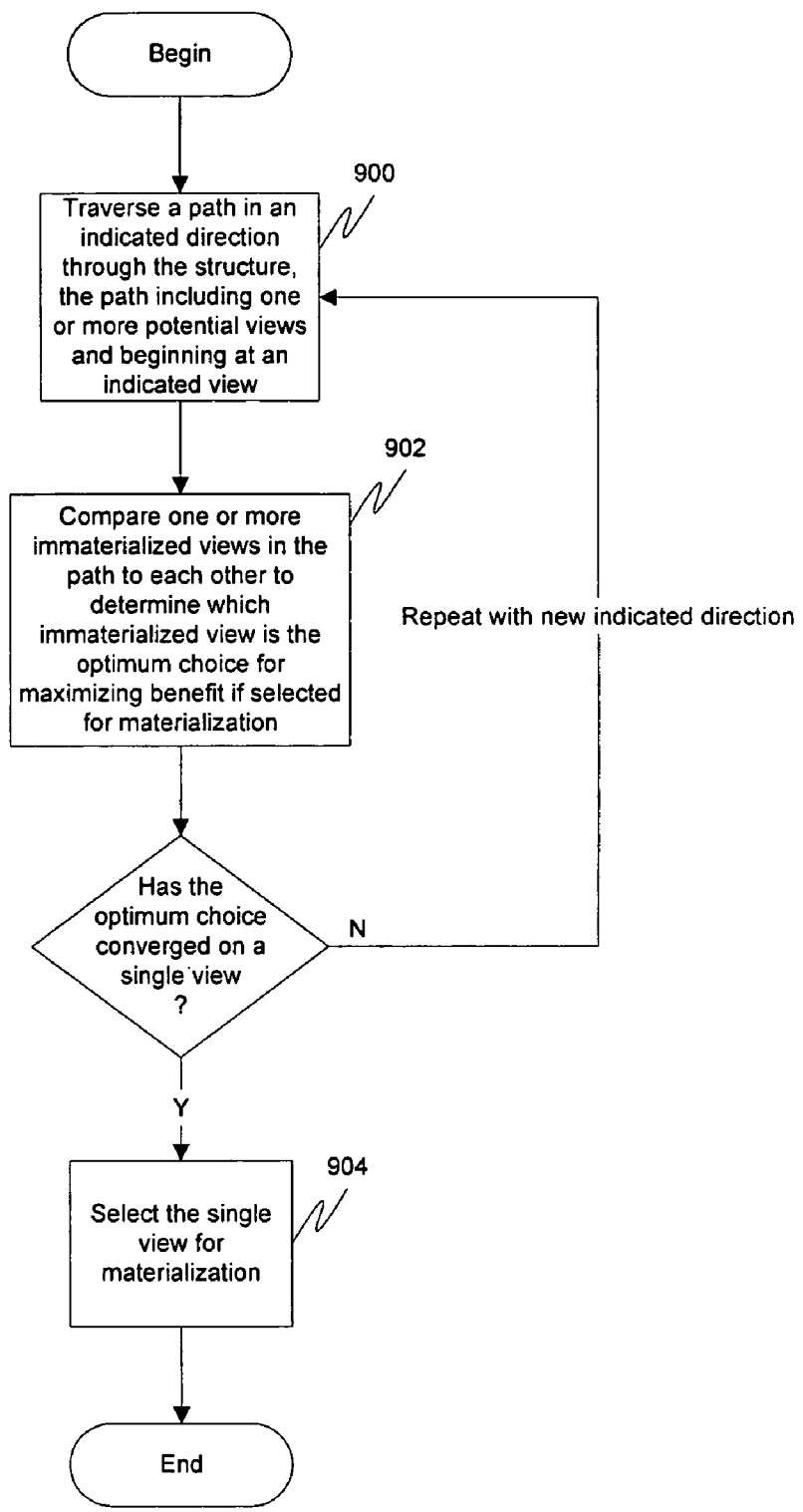
FIG. 9 is a flow diagram illustrating a method for selecting a view to be materialized for a multidimensional database from a set of potential views stored in a structure in accordance with an embodiment of the present invention.

FIG. 9 is a flow diagram illustrating a method for selecting a view to be materialized for a multidimensional database from a set of potential views stored in a structure in accordance with an embodiment of the present invention. Each act in this method may be performed by software, hardware, or any combination thereof. At 900, a path may be traversed in an indicated direction through the structure, the path including one or more potential views and beginning at an indicated view. In an embodiment of the present invention, the indicated direction may be horizontal or vertical, and may alternate between each on each iteration. The traversing of the path may begin at a start point, and in an embodiment of the present invention, the start point may change on each execution of the method. The start point may also be random in an embodiment of the present invention.

In an embodiment of the present invention, the one or more immaterialized views in the path represent every immaterialized view in the path. In another embodiment of the present invention, the one or more immaterialized views in the path represent a random sampling of immaterialized views in the path.

At 902, one or more immaterialized views in the path may be compared to each other to determine which immaterialized view is the optimum choice for maximizing benefit if selected to be materialized. The traversing and comparing may be continually iterated through, each iteration utilizing an indicated direction different than the last, each iteration also utilizing an indicated view set at the optimum choice determined by the last iterations, the iterating continuing until it converges on a single view. In an embodiment of the present invention, the iterating may be assumed to have converged on a single view when the optimum choice repeats in consecutive iterations. At 904, the single view may be selected for materialization. In an embodiment of the present invention, the traversing, comparing, and continually iterating may be repeated for each view selection, resulting in two optimum choices. If the choices are the same, the selection of the single view is easy. If not, then the best of the two optimum choices may be selected. In a further embodiment of the present invention, each repeat may begin from a different start point, for example, one at a root view and one at an end view.

Figure 10:
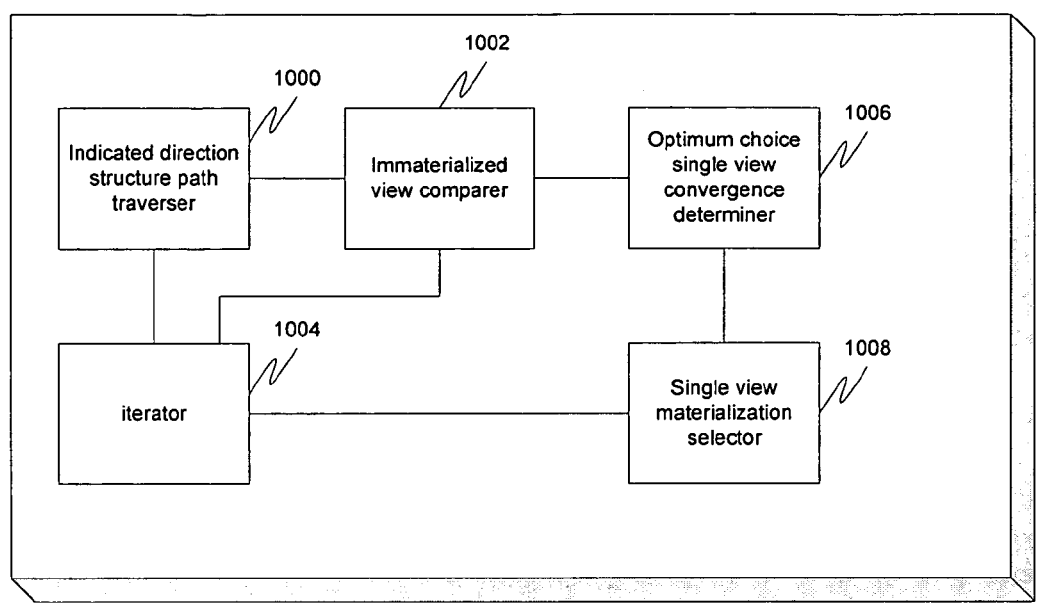
FIG. 10 is a block diagram illustrating an apparatus for selecting a view to be materialized for a multidimensional database from a set of potential views stored in a structure in accordance with an embodiment of the present invention.

FIG. 10 is a block diagram illustrating an apparatus for selecting a view to be materialized for a multidimensional database from a set of potential views stored in a structure in accordance with an embodiment of the present invention. Each element of the apparatus may be software, hardware, or any combination thereof. An indicated direction structure path traverser 1000 may traverse a path in an indicated direction through the structure, the path including one or more potential views and beginning at an indicated view. In an embodiment of the present invention, the indicated direction may be horizontal or vertical, and may alternate between each on each iteration. The traversing of the path may begin at a start point, and in an embodiment of the present invention, the start point may change on each execution of the method. The start point may also be random in an embodiment of the present invention.

In an embodiment of the present invention, the one or more immaterialized views in the path represent every immaterialized view in the path. In another embodiment of the present invention, the one or more immaterialized views in the path represent a random sampling of immaterialized views in the path.

An immaterialized view comparer 1002 coupled to the indicated direction structure path traverser 1000 may compare one or more immaterialized views in the path to each other to determine which immaterialized view is the optimum choice for maximizing benefit if selected to be materialized. The traversing and comparing may be continually iterated through using an iterator 1004 coupled to the indicated direction path traverser 1000 and to the immaterialized view comparer 1002, each iteration utilizing an indicated direction different than the last, each iteration also utilizing an indicated view set at the optimum choice determined by the last iterations, the iterating continuing until it converges on a single view as determined by an optimum choice single view convergence determiner 1006 coupled to the immaterialized view comparer 1002. In an embodiment of the present invention, the iterating may be assumed to have converged on a single view when the optimum choice repeats in consecutive iterations. A single view materialization selector 1008 coupled to the optimum choice single view convergence determiner 1006 may select the single view for materialization. In an embodiment of the present invention, the traversing, comparing, and continually iterating may be repeated for each view selection, resulting in two optimum choices. If the choices are the same, the selection of the single view is easy. If not, then the best of the two optimum choices may be selected. In a further embodiment of the present invention, each repeat may begin from a different start point, for example, one at a root view and one at an end view.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for selecting a view to be materialized for a multidimensional database, the method comprising:
   (a) selecting a first node of a plurality of nodes of a multidimensional structure, each node of the plurality of nodes representing a potential view of the multidimensional database;
   (b) performing, in multiple iterations, the steps of:
      (1) based on a particular node, determining a particular path of nodes in a particular direction through the multidimensional structure, the particular path of nodes comprising the particular node;
      (2) determining a materialization benefit for each of two or more non-materialized views represented by nodes in the particular path of nodes;
      (3) selecting a new node in the particular path of nodes, the new node representing a non-materialized view of the two or more non-materialized views having a higher materialization benefit than any other of the two or more non-materialized views;
   wherein, for a first iteration of steps (1)-(3), the particular node is a first node, the particular direction is a first direction, and the particular path of nodes is a first particular path of nodes;
   wherein, for each iteration of one or more iterations of steps (1)-(3), each iteration being subsequent to the first iteration, the new node of an immediately preceding iteration becomes the particular node, a new direction becomes the particular direction, and a new path of nodes becomes the particular path of nodes;
      wherein the new path of nodes is different from the particular path of nodes of the immediately preceding iteration, and the new direction is different from the particular direction of the immediately preceding iteration;
   (c) determining that, over multiple iterations of steps (1)-(3), selection of the new node in step (3) has converged upon a single node; and,
   (d) in response to step (c), materializing a particular view represented by the single node.

2. The method of claim 1, wherein said particular direction is horizontal or vertical.

3. The method of claim 2, wherein said particular direction alternates between horizontal and vertical on each of the multiple iteration of steps (1) through (3).

4. The method of claim 1, wherein said particular direction is along an axis of the multidimensional structure.

5. The method of claim 4, wherein said particular direction changes to a different axis of the multidimensional structure on each of the multiple iteration of steps (1) through (3).

6. The method of claim 1, further comprising the step of executing steps (a) through (d) two or more times to generate a set of materialized views.

7. The method of claim 6, wherein the first node changes on each execution of steps (a) through (d).

8. The method of claim 6, wherein the step of executing steps (a) through (d) two or more times comprises executing steps (a) through (d) until the set of materialized views is a predetermined size.

9. The method of claim 1, wherein step (a) comprises selecting the first node randomly.

10. The method of claim 1, wherein the selection of the new node in step (3) is said to converge upon the single node when a same new node is selected in step (3) over consecutive iterations of steps (1) through (3).

11. The method of claim 1, wherein said two or more non-materialized views include every non-materialized view represented by the nodes in said particular path of nodes.

12. The method of claim 1, wherein said two or more non-materialized views represent a random sampling of non-materialized views represented by the nodes in said particular path of nodes.

13. The method of claim 1, wherein steps (a) through (d) are repeated for each view selection in the multidimensional database.

14. The method of claim 13, wherein on each iteration of step (a), a different first node is selected.

15. The method of claim 14, wherein said different first nodes include a node representing a root view and a node representing an end view.

16. The method of claim 1, further comprising the steps of:
concurrently executing multiple iterations of steps (a) through (d), including a first iteration of steps (a) through (d) and a second iteration of steps (a) through (d);
wherein the first iteration of steps (a) through (c) is executed with respect to a first particular node, wherein, for the first iteration of steps (a) through (c), the first particular node is the first node and selection of the new node in step (3) converges upon a first single node;
wherein the second iteration of steps (a) through (c) is executed with respect to a second particular node, wherein, for the second iteration of steps (a) through (c), the second particular node is the first node and selection of the new node in step (3) converges upon a second single node; and
executing step (d), wherein the single node is either the first single node or the second single node, depending on which of the views represented by the first single node and the second single node has a higher materialization benefit.

17. The method of claim 16, wherein the first particular node is a root node and the second particular node is an end node.

18. A machine-readable storage medium for selecting a view to be materialized for a multidimensional database, tangibly embodying a set of instructions that, when executed by the machine, causes the machine to perform the steps of:
(a) selecting a first node of a plurality of nodes of a multi-dimensional structure, each node of the plurality of nodes representing a potential view of the multidimensional database;
(b) performing, in multiple iterations, the steps of:
(1) based on a particular node, determining a particular path of nodes in a particular direction through the multidimensional structure, the particular path of nodes comprising the particular node;
(2) determining a materialization benefit for each of two or more non-materialized views represented by nodes in the particular path of nodes;
(3) selecting a new node in the particular path of nodes, the new node representing a non-materialized view of the two or more non-materialized views having a higher materialization benefit than any other of the two or more non-materialized views;
wherein, for a first iteration of steps (1)-(3), the particular node is a first node, the particular direction is a first direction, and the particular path of nodes is a first particular path of nodes;
wherein, for each iteration of one or more iterations of steps (1)-(3), each iteration being subsequent to the first iteration, the new node of an immediately preceding iteration becomes the particular node, a new direction becomes the particular direction, and a new path of nodes as becomes the particular path of nodes;
wherein the new path of nodes is different from the particular path of nodes of the immediately preceding iteration, and the new direction is different from the particular direction of the immediately preceding iteration;
(c) determining that, over multiple iterations of steps (1)-(3), selection of the new node in step (3) has converged upon a single node; and,
(d) in response to step (c), materializing a particular view represented by the single node.

19. The machine-readable storage medium of claim 18, wherein said particular direction is horizontal or vertical.

20. The machine-readable storage medium of claim 19, wherein said particular direction alternates between horizontal and vertical on each of the multiple iteration of steps (1) through (3).

21. The machine-readable storage medium of claim 18, wherein said particular direction is along an axis of the multidimensional structure.

22. The machine-readable storage medium of claim 21, wherein said particular direction changes to a different axis of the multidimensional structure on each of the multiple iteration of steps (1) through (3).

23. The machine-readable storage medium of claim 18, wherein the set of instructions, when executed by the machine, further causes the machine to perform the step of executing steps (a) through (d) two or more times to generate a set of materialized views.

24. The machine-readable storage medium of claim 23, wherein the step of executing steps (a) through (d) two or more times comprises executing steps (a) through (d) until the set of materialized views is a predetermined size.

25. The machine-readable storage medium of claim 23, wherein the first node changes on each execution of steps (a) through (d).

26. The machine-readable storage medium of claim 18, wherein step (a) comprises selecting the first node randomly.

27. The machine-readable storage medium of claim 18, wherein the selection of the new node in step (3) is said to converge upon the single node when a same new node is selected in step (3) over consecutive iterations of steps (1) through (3).

28. The machine-readable storage medium of claim 18, wherein said two or more non-materialized views include every non-materialized view represented by the nodes in said particular path of nodes.

29. The machine-readable storage medium of claim 18, wherein said two or more non-materialized views represent a random sampling of non-materialized views represented by the nodes in said particular path of nodes.

30. The machine-readable storage medium of claim 18, wherein steps (a) through (d) are repeated for each view selection in the multidimensional database.

31. The machine-readable storage medium of claim 30, wherein on each iteration of step (a), a different first node is selected.

32. The machine-readable storage medium of claim 31, wherein said different first nodes include a node representing a root view and a node representing an end view.

33. The machine-readable storage medium of claim 18, wherein the set of instructions, when executed by the machine, further causes the machine to perform the steps of:

concurrently executing multiple iterations of steps (a) through (d), including a first iteration of steps (a) through (d) and a second iteration of steps (a) through (d);

wherein the first iteration of steps (a) through (c) is executed with respect to a first particular node, wherein, for the first iteration of steps (a) through (c), the first particular node is the first node and selection of the new node in step (3) converges upon a first single node;

wherein the second iteration of steps (a) through (c) is executed with respect to a second particular node, wherein, for the second iteration of steps (a) through (c), the second particular node is the first node and selection of the new node in step (3) converges upon a second single node; and executing step (d), wherein the single node is either the first single node or the second single node, depending on which of the views represented by the first single node and the second single node has a higher materialization benefit.

34. The machine-readable storage medium of claim 33, wherein the first particular node is a root node and the second particular node is an end node.

35. An apparatus for selecting a view to be materialized for a multidimensional database, the apparatus including one or more processors coupled to a memory being configured to perform each of the following steps:

(a) selecting a first node of a plurality of nodes of a multidimensional structure, each node of the plurality of nodes representing a potential view of the multidimensional database;

(b) performing, in multiple iterations, the steps of:
(1) based on a particular node, determining a particular path of nodes in a particular direction through the multidimensional structure, the particular path of nodes comprising the particular node;
(2) determining a materialization benefit for each of two or more non-materialized views represented by nodes in the particular path of nodes;
(3) selecting a new node in the particular path of nodes, the new node representing a non-materialized view of the two or more non-materialized views having a higher materialization benefit than any other of the two or more non-materialized views;

wherein, for a first iteration of steps (1)-(3), the particular node is a first node, the particular direction is a first direction, and the particular path of nodes is a first particular path of nodes;

wherein, for each iteration of one or more iterations of steps (1)-(3), each iteration being subsequent to the first iteration, the new node of an immediately preceding iteration becomes the particular node, a new direction becomes the particular direction, and a new path of nodes as becomes the particular path of nodes;

wherein the new path of nodes is different from the particular path of nodes of the immediately preceding iteration, and the new direction is different from the particular direction of the immediately preceding iteration;

(c) determining that, over multiple iterations of steps (1)-(3), selection of the new node in step (3) has converged upon a single node; and, (d) in response to step (c), materializing a particular view represented by the single node.

36. The apparatus of claim 35, wherein said particular direction is horizontal or vertical.

37. The apparatus of claim 36, wherein said particular direction alternates between horizontal and vertical on each of the multiple iteration of steps (1) through (3).

38. The apparatus of claim 35, wherein said particular direction is along an axis of the multidimensional structure.

39. The apparatus of claim 38, wherein said particular direction changes to a different axis of the multidimensional structure on each of the multiple iteration of steps (1) through (3).

40. The apparatus of claim 35, further comprising steps of executing steps (a) through (d) two or more times to generate a set of materialized views.

41. The apparatus of claim 40, wherein the step of executing steps (a) through (d) two or more times comprises executing steps (a) through (d) until the set of materialized views is a predetermined size.

42. The apparatus of claim 40, wherein the first node changes on each execution of steps (a) through (d).

43. The apparatus of claim 35, wherein step (a) comprises selecting the first node randomly.

44. The apparatus of claim 35, wherein the selection of the new node in step (3) is said to converge upon the single node when a same new node is selected in step (3) over consecutive iterations of steps (1) through (3).

45. The apparatus of claim 35, wherein said two or more non-materialized views include every non-materialized view represented by the nodes in said particular path of nodes.

46. The apparatus of claim 35, wherein said two or more non-materialized views represent a random sampling of non-materialized views represented by the nodes in said particular path of nodes.

47. The apparatus of claim 35, wherein steps (a) through (d) are repeated for each view selection in the multidimensional database.

48. The apparatus of claim 47, wherein on each iteration of step (a), a different first node is selected.

49. The apparatus of claim 48, wherein said different first nodes include a node representing a root view and a node representing an end view.

50. The apparatus of claim 35, further comprising:
concurrently executing multiple iterations of steps (a) through (d), including a first iteration of steps (a) through (d) and a second iteration of steps (a) through (d);

wherein the first iteration of steps (a) through (c) is executed with respect to a first particular node, wherein, for the first iteration of steps (a) through (c), the first particular node is the first node and selection of the new node in step (3) converges upon a first single node;

wherein the second iteration of steps (a) through (c) is executed with respect to a second particular node, wherein, for the second iteration of steps (a) through (c), the second particular node is the first node and selection of the new node in step (3) converges upon a second single node; and executing step (d), wherein the single node is either the first single node or the second single node, depending on which of the views represented by the first single node and the second single node has a higher materialization benefit.

51. The apparatus of claim 50, wherein the first particular node is a root node and the second particular node is an end node.

* * * * *

UNITED STATES PATENT AND TRADEMARK OFFICE
CERTIFICATE OF CORRECTION

| | | |
|---|---|---|
| PATENT NO. | : 7,467,127 B1 | Page 1 of 1 |
| APPLICATION NO. | : 10/863870 | |
| DATED | : December 16, 2008 | |
| INVENTOR(S) | : Baccash et al. | |

It is certified that error appears in the above-identified patent and that said Letters Patent is hereby corrected as shown below:

In column 10, line 4, in Claim 18, after "nodes" delete "as".

In column 11, line 55, in Claim 35, after "nodes" delete "as".

Signed and Sealed this

Twenty-seventh Day of April, 2010

David J. Kappos
*Director of the United States Patent and Trademark Office*